United States Patent Office 3,483,277
Patented Dec. 9, 1969

3,483,277
POLYMERS OF O-ACRYLYL- AND O-METHACRYLYLAMIDOXIMES
Eduard K. Kleiner, New York, N.Y., assignor to Geigy Chemical Corporation, Ardsley, N.Y., a corporation of Delaware
No Drawing. Filed Oct. 17, 1966, Ser. No. 586,956
Int. Cl. C08j 37/18; C08f 29/50
U.S. Cl. 260—897                              30 Claims

ABSTRACT OF THE DISCLOSURE

Polymers having a skeletal chain comprising repeating units represented by the formula:

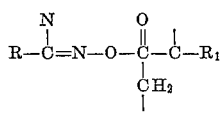

wherein R is $C_nX_{2n+1}$, monocarbocyclic aryl or alkyl-monocarbocyclic aryl; $n$ is a whole number of from 1 to 18; X is hydrogen or fluorine; $R_1$ is hydrogen or methyl; and acid-addition salts thereof, the $C_nX_{2n+1}$ radical being straight or branched chain, are useful as dyesites for acidic, direct or metalized dyes, for the protection and stabilization of organic substrates against deterioration due to ultraviolet light, and those polymers which contain fluorine provide oil- and water-repellent finishes useful in treating materials such as textiles, paper, leather, painted wooden and metallic surfaces.

---

This invention relates to novel polymers with soil-repellent and dye-fixing properties. More particularly it relates to homopolymers and copolymers of O-acrylyl- and O-methacrylylamidoximes and salts thereof. Of the new polymers, those which contain fluorine provide oil- and water-repellent finishes useful to treat materials such as textiles, paper, leather, painted wooden and metallic surfaces, and the like. In addition, all of the polymers that contain free amino groups are useful as dyesites for acidic direct or metallized dyestuffs. The polymers also are of use to protect and stabilize organic substrates against the deteriorative effects of ultraviolet light.

The polymers contemplated by the instant invention are made by polymerizing compounds selected from those of Formula I:

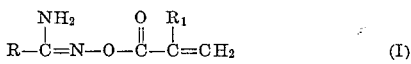  (I)

wherein R is $C_nX_{2n+1}$, monocarbocyclic aryl or alkyl-monocarbocyclic aryl; $n$ is a whole number of from 1 to 18; X is hydrogen or fluorine; $R_1$ is hydrogen or methyl; and acid-addition salts thereof. The $C_nX_{2n+1}$ radical may be straight or branched chain.

Thus polymers contemplated by the present invention are comprised of repeating units of the formula:

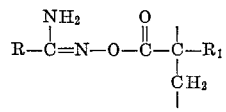

wherein R and $R_1$ are defined as above and the acid-addition salts thereof.

Special mention is made of an especially valuable embodiment of this invention. This comprises polymers of compounds of the formula above wherein R is $C_nX_{2n+1}$ and X is fluorine or hydrogen. The new fluoro-polymers are characterized by excellent resistance to hydrolysis. This provides substantial advantage in their use as fabric finishes, when compared to finishes previously used for the purpose of soil repellency. Fabrics finished with polymers made from these fluorine-containing monomers retain their soil-repellent properties after repeated washings. They are especially useful where soil redeposition is a problem. They have, in addition, markedly superior light-fastness and color fastness. They are resistant to removal in dry cleaning operations. Those polymers wherein X is hydrogen are especially useful as ultraviolet stabilizers; and those wherein X is fluorine combine soil-repellent properties with enhanced ultraviolet stabilization.

Especially useful as embodiments of this invention are polymers of the compounds O-methacrylyl perfluorooctanoamidoxime, a compound of the above formula in which R is $C_nX_{2n+1}$, $n$ is 7, X is fluorine and $R_1$ is methyl; O-methacrylyl perfluorobutyramidoxime, a compound of the above formula wherein R is $C_nX_{2n+1}$, $n$ is 3, X is fluorine and $R_1$ is methyl; O-methacrylyl acetamidoxime, a compound of the above formula wherein R is $C_nX_{2n+1}$, $n$ is 1, X is hydrogen and $R_1$ is methyl; O-methacrylyl benzamidoxime, a compound of the above formula wherein R is phenyl and $R_1$ is methyl; and O-methacrylyl propionamidoxime, a compound of the above formula wherein R is $C_nX_{2n+1}$, $n$ is 2, X is hydrogen and $R_1$ is methyl, and the hydrochloric acid-addition salt thereof. The term "acrylyl" when used herein and in the appended claims contemplates as well "methacrylyl." The term "polymers" includes homopolymers and copolymers. The term "monocarbocyclic aryl" contemplates phenyl or phenyl substituted with from 1 to 5 and preferably from 1 to 3 of the following: fluoro, chloro, bromo, iodo, trifluoromethyl, alkoxy of from 1 to 6 carbon atoms, alkyl of from 1 to 6 carbon atoms, alkanoylamino wherein the alkanoyl group contains from 1 to 6 carbon atoms or phenyl.

Polymers of the instant amidoximes are amphoteric substances. The amino group in the molecule confers basic properties on the amidoximes and their polymers. Salts of the instant polymers of amidoximes with mineral or organic acids are within the scope of this invention. Illustrative of acids forming the instant acid-addition salts are: hydrochloric, hydrobromic, sulfuric, phosphoric, methanesulfonic, acetic, lactic, succinic, malic, maleic, aconitic, phthalic, tartaric, and the like.

Also contemplated are copolymers of compounds of Formula I above with comonomers which contain an ethylenic linkage. The O-acrylyl and O-methacrylylamidoximes form copolymers with many comonomers. Illustrative of the said comonomers which contain an ethylenic linkage are ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, methacrylic acid and alkyl esters thereof, alpha-chloro acrylic acid and alkyl esters thereof, methacrylonitrile, vinyl carbazole, vinyl pyrrolidone, vinyl pyridine, vinyl alkyl ethers, vinyl alkyl ketones, butadiene, fluorinated butadienes, chloroprene, fluoroprene, isoprene, and the like. Especially useful to form soil-repellent finishes are copolymers of O-methacrylyl perfluorooctanoylamidoxime and esters of acrylic and methacrylic acids derived from alcohols containing from about 1 to about 16 carbon atoms, such as lauryl methacrylate, octyl methacrylate, hexyl acrylate, ethyl acrylate, 2-ethylhexyl acrylate, and the like.

Since the novel fluoropolymers and copolymers find substantial use as textile finishes, it is an advantage to include in the monomer mixture from about 0.2 to about 5% by weight of a reactive acrylic, which permits crosslinking either by heat or crosslinking agents. Such reactive fluorocopolymers give textile finishes with superior resistance to washing, dry cleaning, scrubbing, abrasion and crushing, both wet and dry, and also a better durability of the oil and water repellency.

Illustrative of such reactive comonomers are those derivatives of acrylic or methacrylic acid exhibiting a moiety which, as a pendant group on the resultant interpolymer, is capable of reacting with another compound so as to effect crosslinking. Such groups are well known and may be hydroxy as in the case of a hydroxyalkyl acrylate, carboxy as in the case of acrylic or methacrylic acid, epoxy as in the case of glycidyl methacrylate, methylolamido as in the case of N-methylolacrylamide or alkoxymethylamido as in the case of an etherified methylol acrylamide. Also useful are acrylamide and methacrylamide.

This invention also contemplates in one of its embodiments polymers having a skeletal chain consisting essentially of repeating units represented by the formula

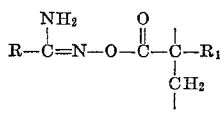

wherein R and $R_1$ are as above defined.

The starting materials useful to prepare the new compounds can be prepared from readily available materials according to the reaction outlined in the following sequence:

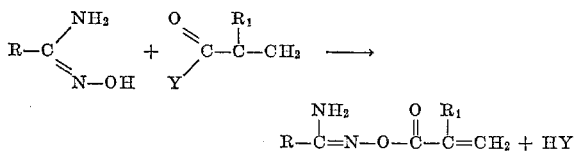

wherein $n$, R and $R_1$ are as above defined and Y is halogen such as chlorine or bromine. The condensation is effected merely by bringing together the amidoxime and the acrylyl or substituted acrylyl halide. It is preferred to conduct the reaction in a solvent, suitably dry acetonitrile, and to stir the reaction mixture for from about 1 hour to about 12 hours at a temperature of from about 25° C. to about 85° C. to insure highest yields. The product is recovered by evaporating the solvent, when X is F; and by treating with water, neutralizing with a weak base and extracting the product with a water-immiscible organic solvent when X is hydrogen. The product, which remains as a residue, can be purified, if desired, by recrystallization from a hydrocarbon solvent, such as petroleum ether mixed with a ketone, such as acetone, or an ester, such as ethyl acetate.

The starting materials are readily available or can be prepared by techniques within the capabilities of those skilled in the art. Alkylamidoximes and salts, for example, can be prepared by simple modifications of the procedures reviewed by Eloy and Lenaers in Chem. Reviews, 62, 155 (1962). Perfluoroalkyl analogs thereof are described in Brown and Wetzel in J. Org. Chem. 30, 3734 (1965). The acrylyl and methacrylyl halides are items of commerce or can be obtained, for example, by the procedures described in the literature of the art to which the present invention pertains.

The starting materials can be prepared, for example, by mixing, in an alcoholic solvent, an appropriate nitrile with free hydroxylamine (which can be generated from its hydrochloride in methanol by the addition of equivalent amounts of an alcoholic solution of sodium methoxide). The mixture is stirred until addition of the hydroxylamino group is substantially complete, which requires from about 30 minutes to about 4 days, depending on the reactivity of the reagents and the temperature of the mixture. With perfluoro-nitriles, which are somewhat more reactive, a temperature of about 25° C. is used; less reactive nitriles are converted at somewhat higher temperatures e.g., about 50° C. The starting material is recovered by filtering of the by-product salt, then removing the solvent by distillation. Purification, if desired, is accomplished by recrystallization from chloroform or carbon tetrachloride, or by distillation under reduced pressure.

The instant homopolymers and copolymers are formed by standard procedures well known to those skilled in the art. Polymerization occurs readily by bulk, solution or emulsion techniques, employing free radical-forming catalysts. The ratios of percentages by weight of the respective monomers used can vary widely in the formation of useful copolymers. For example, charge ratios of the O-acryl and O-methacrylyl amidoxime monomers may vary from 1 to 99% by weight of the total monomer mixture. It is preferred, however, for the best balance of economy and ultimate properties in soil repellant fabrics, to use between about 40 and about 90% by weight of the instant monomers based on the total monomer mixture.

The copolymers broadly contemplated can have at least three structural variations: they can be homogeneous copolymers; or they can exist in the form of segmented (or heterogeneous) copolymers; or they can comprise physical blends of O-acrylyl and O-methacrylyl amidoxime homopolymers or copolymers blended with a non-fluorine containing homo- or co-polymer. The term "copolymer" used herein broadly contemplates these above-mentioned variations, as well as all copolymers of the said amidoximes obvious to those skilled in the art. Exemplification for the preparation of homogeneous copolymers if given hereinafter. Suitable techniques applicable to the preparation of segmented or heterogeneous copolymers within the scope of this invention are exemplified in U.S. 3,068,187. The preparation of copolymer blends within the scope of this invention can be achieved by employing appropriate monomers and the detailed description in Belgian Patents Nos. 635,437 and 645,697. In some instances copolymers with superior repellencies are obtained as the result of application of the latter two techniques.

In general all polymerization techniques and procedures as to kind and amount of catalyst, emulsifiers, chain regulators, solvents, and the like are well within the capabilities of those skilled in the art to which this invention pertains.

Films of the homopolymers and copolymers can be prepared either by casting from solvent solutions or from aqueous emulsions. Especially useful as solvents are fluorinated liquids, and special mention is made of $\alpha,\alpha,\alpha$-trifluorotoluene, also known as benzotrifluoride, hexafluoroxylene and mixtures of these with ethyl acetate or acetone and the like.

It is also uniquely advantageous, especially in the preparation of fabric finishes, to use blends of emulsions of the instant fluorinated homopolymers with emulsions of other homopolymers such as polyalkyl acrylates and polyalkyl methacrylates, illustrative of which is poly n-octyl methacrylate. Since the instant homopolymers of certain of O-acrylyl- and O-methacrylyl-amixodimes have a tendency to be brittle and high melting, blending them with, for example, from about 20 to about 97% by weight of a homopolymer such as poly-n-octyl methacrylate provides useful compositions which, surprisingly, retain high repellency ratings even though the relative amount of polymer of the instant monomers is quite low.

As has been mentioned hereinabove, the present invention in one of its embodiments provides compositions stabilized against actinic degradation. It is known that actinic radiation, particularly ultraviolet radiation, causes deterioration in the appearance and properties of organic substances. It is well known, for example, that sunlight causes light-colored polyesters and cellulosics to become yellow. Furthermore, after exposure to sunlight, polystyrene discolors and cracks, and vinyl resins spot and degrade. In addition, ultraviolet radiation increases the rate at which polypropylene and polyethylene are degraded by air oxidation. The present invention provides novel compositions of matter protected against ultraviolet degradation, which are, in essence, plastic compositions comprising a normally solid, organic, thermoplastic polymer subject to actinic degradation containing a stabilizing amount of a polymer of Formula I wherein, in said compound, R is $C_nX_{2n+1}$, monocarbocyclic aryl or alkyl-monocarbocyclic aryl and X is hydrogen.

Special mention is made of especially preferred compositions within the scope of this invention. These comprise compositions in which the said thermoplastic polymer is solid stereoregular polypropylene and wherein the stabilizing polymer is poly-(O-methacrylyl acetamidoxime), poly-(O-methacrylyl propionamidoxime hydrochloride), poly-(O-methacrylyl propionamidoxime) or poly-(O-methacrylyl benzamidoxime).

The term "actinic degradation" contemplates that due to incident radiation in the near ultraviolet region of about 2500–3700 Angstroms. Because this radiation produces harmful chemical and physical changes in plastics, the useful life of the polymer is shortened. Typical of the polymers harmed by such degradation are normally solid, organic, thermoplastic polymers such as vinylic resins, illustrative of which are those formed from the polymerization of vinyl halides or from the copolymerization of vinyl halides with unsaturated polymerizable compounds, for example, vinyl esters, $\alpha,\beta$-unsaturated esters, $\alpha,\beta$-unsaturated ketone, $\alpha,\beta$-unsaturated aldehydes and unsaturated hydrocarbons such as butadiene or styrene; poly-$\alpha$-olefins such as polyethylene, polypropylene, polybutylene, polybutene-1, poly-(4-methylpentene-1), and the like, including copolymers of poly-$\alpha$-olefins; polyurethanes such as are prepared from polyols and organic polyisocyanates; polyamides such as polyhexamethylene adipamide; polyesters such as polymethylene terephthalates; polycarbonates; polyacetals; polystyrene; polyethylene oxide; and copolymers such as those of high impact polystyrene containing copolymers of butadiene and styrene and those formed by the copolymerization of acrylonitrile, butadiene and/or styrene; and the like. Particularly useful are compositions in which the polymer subject to actinic degradation is a polyolefin containing tertiary carbon atoms. These are particularly subject to attack by actinic degradation in practical environments. The most useful polymers of this structure are stereoregular, and particularly isotactic. Tertiary carbon atoms also occur, however, in syndiotactic and in atactic polyolefins, including homopolymers and copolymers. An especially useful feature of the instant invention is the provision of stabilized stereoregular polypropylene of commercially satisfactory stability.

Homogeneous mixtures of the stabilizing polymer in the polymer to be stabilized can be made by mechanical techniques such as Banburying or hot milling. Alternatively, with appropriate monomers such as styrene or methyl methacrylate, the stabilizing polymer can be dispersed or dissolved in the monomer prior to polymerization or curing. Or the stabilizer can conveniently be incorporated in a slurry of finely divided particles of the resin to be stabilized, such as may be produced during the manufacture of the polymer.

Only sufficient stabilizer is required to stabilize the polymer against actinic degradation. Depending on the nature of the polymer, the particular stabilizer employed, and the severity of exposure of the resulting composition, from about 0.001% to 10% by weight of the stabilizer, based on the polymer, will be required. In most cases, however, from about 0.1% to about 5% on the same basis will be sufficient.

The present invention also relates to compositions comprising difficultly dyeable organic materials and, as an assistant and dyesite, a compound of Formula I wherein, in said compound, R is $C_nX_{2n+1}$, monocarbocyclic aryl or alkyl-monocarbocyclic aryl and X is hydrogen. While the inherent physical properties of synthetic organic polymeric substances, such as poly-$\alpha$-olefins of the polyethylene and polypropylene type, make possible a wide range of applications, they also present a number of problems in processing and use, such as the heat and light instability mentioned above and a marked resistance to dyeing. One embodiment of the present invention is based on the discovery that the instant polymers, particularly those which do not contain fluorine, render difficultly dyeable organic material more amenable to dyeing. Particularly effective for this purpose are poly(O-methacrylyl acetamidoxime); poly(O-methacrylyl propionamidoxime hydrochloride); poly(O-methacrylyl propionamidoxime); and poly(O-methacrylyl benzamidoxime).

The compounds of this invention may be incorporated in the difficultly dyeable organic substance during the usual processing operations. Thus for example, they can be introduced into polypropylene by hot milling, the polymers then being extruded, pressed, blow molded or the like, into films, fibers, filaments, hollow shapes and the like. The new compositions can be dyed, either directly after compounding or after further processing, such as the formation of yarns or fabrics.

The conditions of dyeing will of course vary with the particular dye employed. Generally the nature of the dye is not restricted and any of the many known dyes may be employed. Generally from about 0.05 to 10% and preferably about 0.1 to 6% by weight of the instant polymers in the difficultly dyeable organic material, is used, but the amount is not critical.

While polypropylene has been herein mentioned specifically, it is apparent that the instant compounds are useful in numerous other substances whose regular and inert chemical structures tend to resist dyes. Materials for which the compounds of the present invention are useful thus include synthetic organic polymeric substances, both homopolymeric and copolymeric, such as vinyl resins, poly-$\alpha$-olefins, polyurethanes, polyamides, polyesters, polycarbonates, polyacetals, polystyrene polyacrylics, and the like.

The following procedures are illustrative of the preparation of compounds useful to prepare the polymers of this invention:

PROCEDURE A

O-methacrylyl perfluorooctanoamidoxime

Perfluorooctanoamidoxime (prepared according to H. C. Brown and C. R. Wetzel, J. Org. Chem. 30, 3734 (1965); 27 g., 0.063 mole) is finely pulverized and suspended in dry acetonitrile (140 ml.). A solution of methacrylyl chloride (6.6 g., 0.063 mole) in 14 ml. of dry acetonitrile is added to the suspension dropwise at room temperature with vigorous stirring. The mixture is stirred for two hours at room temperature and then refluxed for two additional hours. Removal of the solvent under reduced pressure leaves a crystalline product, which after crystallization from acetone-hexane affords 27 g. (86%) of O-methacrylyl perfluorooctanoamidoxime, M.P. 132.5–137° C.

The NMR spectrum (acetone-$d_6$) shows a doublet at 2.00$\delta$ (CH$_3$), two multiplets at 5.71 and 6.24 for the vinylic protons and a broad signal at 6.97 for the —NH$_2$—. The infrared spectrum has absorptions at 2.8–3.0$\mu$ (NH$_2$), 5.75 (C=O), 6.0 (C=N) and 6.2 (C=C).

Analysis.—Calc. for $C_{12}F_{19}H_7N_2O_2$: C, 29.04; H, 1.42. Found: C, 29.24; H, 1.36.

PROCEDURE B

O-methacrylyl perfluorobutyramidoxime

Perfluorobutyramidoxime (13.1 g., 0.061 mole) is dissolved in dry acetonitrile (50 ml.). Methacrylyl chloride (6.37 g., 0.061 mole) in 10 ml. of acetonitrile is then added dropwise at room temperature with vigorous stirring. The mixture is stirred three hours at room temperature and then the volatile material removed under vacuum. The solid product is crystallized from benzene to afford 4.5 g. of O-methacrylyl perfluorobutyramidoxime, M.P. 109–110° C. The NMR and infrared spectrums conform to the indicated structure.

PROCEDURE C

O-methacrylyl acetamidoxime

Acetamidoxime (prepared according to R. Lenaers, C. Moussebois and F. Eloy, Helv. Chim. Acta, 15, 441 (1962); 14.8 g., 0.2 mole) is suspended in 50 ml. of dry acetonitrile. A solution of methacrylyl chloride (20.9 g., 0.2 mole) in 30 ml. of dry acetonitrile is then added dropwise with vigorous stirring at room temperature. The mixture is stirred twelve hours at room temperature and then poured in ice-water; the solution is neutralized with saturated solution of sodium bicarbonate and extracted with chloroform. The chloroform extract is dried over sodium sulphate, filtered and the solvent is removed under vacuum. The solid residue is crystallized from ethyl-acetate-petroleum ether to afford 9.5 g. of product, M.P. 80–82.5° C.

The NMR spectrum shows a singlet at 2.00 (two methyls), a broad signal at 5.14 for the $NH_2$ and two multiplets at 5.37 and 6.10 for the vinylic protons. An infrared spectrum confirms the indicated structure.

PROCEDURE D

O-methacrylyl benzamidoxime

This compound is prepared from benzamidoxime (prepared according to F. Tiemann and P. Kruger, Ber., 17, 1685 [1884]) and methacrylyl chloride following the same procedure for the methyl analogs with the difference that the reaction mixture is worked up after four hours at room temperature. The yield is 95% and the product melts at 115–116° C. (from ethyl acetate-petroleum ether).

PROCEDURE E

O-methacrylyl propioamidoxime hydrochloride

Propioamidoxime (prepared according to E. Nordmann, Ber., 17, 2746 [1884]) (20 g.) and methacrylic chloride (23 g.) are allowed to react in acetonitrile (80 ml.) for one hour at room temperature. The salt which precipitates almost immediately is filtered and dried to afford 36.1 grams of product, M.P. 165° C. (dec.).

PROCEDURE F

O-methacrylyl propioamidoxime

The hydrochloride of Procedure E (5 g.) is dissolved in 20 ml. of water and the solution is neutralized with saturated solution of sodium bicarbonate. Then it is extracted with chloroform; the chloroform extract is dried, filtered and the solvent is removed from the filtrate under vacuum. The solid product (3.8 g.) is crystallized from ethylacetate-petroleum ether. M.P. 71–73° C.

PROCEDURE G

The procedure of Procedure A is repeated with stoichiometrically-equivalent amounts of alkyl-, aryl- or perfluoroalkylamidoximes and acrylyl and methacrylyl halides. The following substituted acrylyl amidoximes are obtained:

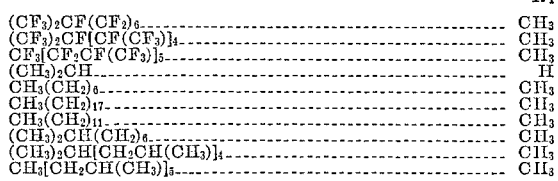

| R: | $R_1$ |
|---|---|
| $CF_3$ | $CH_3$ |
| $(CF_3)_2CF$ | H |
| $CF_3(CF_2)_6$ | $CH_3$ |
| $CF_3(CF_2)_{17}$ | $CH_3$ |
| $CF_3(CF_2)_{11}$ | $CH_3$ |
| $CF_3(CF_2)_{10}$ | H |
| $CF_3(CF_2)_{10}$ | $CH_3$ |
| $CF_3(CF_2)_6$ | H |
| $(CF_3)_2CF(CF_2)_6$ | $CH_3$ |
| $(CF_3)_2CF[CF(CF_3)]_4$ | $CH_3$ |
| $CF_3[CF_2CF(CF_3)]_5$ | $CH_3$ |
| $(CH_3)_2CH$ | H |
| $CH_3(CH_2)_6$ | $CH_3$ |
| $CH_3(CH_2)_{17}$ | $CH_3$ |
| $CH_3(CH_2)_{11}$ | $CH_3$ |
| $(CH_3)_2CH(CH_2)_6$ | $CH_3$ |
| $(CH_3)_2CH[CH_2CH(CH_3)]_4$ | $CH_3$ |
| $CH_3[CH_2CH(CH_3)]_5$ | $CH_3$ |

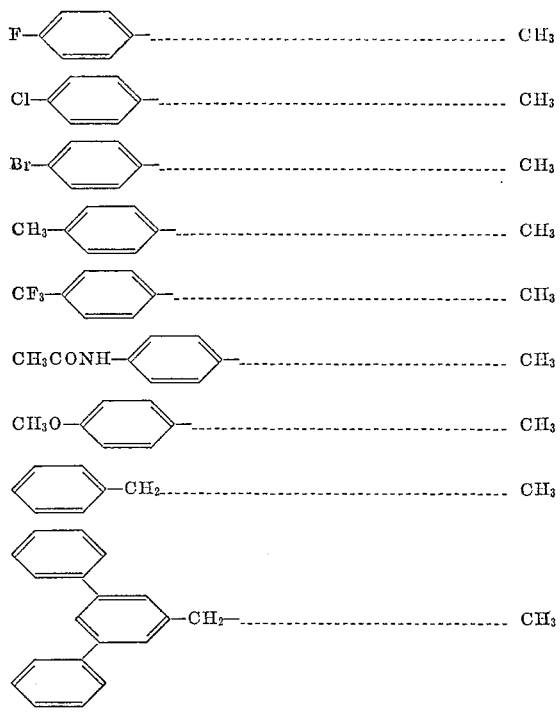

The following examples are illustrative of the polymers of the instant invention. They are provided for the purposes of exemplification and are not to be construed to limit the scope of the claims in any manner.

EXAMPLE I

Poly(O-methacrylyl perfluorooctanoamidoxime)

O-methacrylyl perfluorooctanoamidoxime (prepared by Procedure A), 10 g., and 0.2 g. of azobisisobutyronitrile are dissolved in 30 g. of ethyl acetate and the solution is sealed in an ampul under nitrogen. After polymerizing at 80° for 16 hours, the ampul is opened and the precipitated polymer is dissolved in 90 g. of a mixture of hexafluoroxylene-ethyl acetate (3:1) and precipitated again by pouring the polymer solution dropwise under vigorous stirring into 2000 ml. of methanol. The polymer is collected by filtration and is dried. The white, brittle polymer has a second order transition temperature (Tg-value) of 148° C., and a melting point of 170° C., determined by differential thermal analysis. The polymer is dissolved in a mixture of hexafluoroxylene-ethyl acetate (3:1) to provide a 2% concentration by weight and the solution is applied to cotton and wool fabrics. The following repellency ratings are obtained:

| Fabric | 3-M-Oil Test | AATCC Water Spray Test |
|---|---|---|
| Cotton | 80 | 80 |
| Wool | 90 | 80 |

The AATCC Water-Spray Test rating is determined according to Standard Test Method 22–1966 of the American Association of Textile Chemists and Colorists, XXXVII, 1961, p. 152 (also designated ASTM D 583–58). Oil repellency is measured by the 3–M–Oil test procedure of Grajek and Peterson, Textile Research Journal, April 1962, p. 323.

EXAMPLE II

Copolymers of O-methacrylyl perfluorooctanoamidoxime and n-octylmethacrylate

Copolymers of O-methacrylyl perfluorooctanoamidoxime and n-octylmethacrylate are prepared as follows: 10 parts by weight of the monomer mixture and 0.2 part of azobisisobutyronitrile are dissolved in 20 parts of ethyl acetate and the monomer solutions are sealed in an ampul under nitrogen and polymerized for 16 hours at 80°. Then the ampul is opened and the viscous polymer solutions are diluted with another 20 parts of ethyl acetate and are precipitated into 1000 parts of methanol. The filtered and dried copolymers are analyzed by C and H analysis and it is found that the copolymer composition is ±2% within the limits of the composition of the monomer mixture. 2% by weight of the copolymers from a 2% solution in benzotrifluoride is applied to cotton and wool as described in Example I and the following repellency ratings are obtained.

| Copolymer Composition | | Repellency Ratings | | |
|---|---|---|---|---|
| Monomer Procedure A, Percent | n-Octyl-methacrylate, Percent | Fabric | 3-M-Oil Test | AATCC Water Spray Test |
| 83 | 17 | Cotton | 80 | 90 |
| | | Wool | 80 | 90 |
| 66 | 34 | Cotton | 70 | 80 |
| | | Wool | 70 | 80 |
| 56 | 44 | Cotton | 60 | 80 |
| | | Wool | 60 | 80 |
| 40 | 60 | Cotton | 50 | 70 |
| | | Wool | 50 | 80 |

EXAMPLE III

Hydrolytical stability of a copolymer of O-methacrylyl perfluorooctanoamidoxime and N-octylmethacrylate According to the procedure described in Example II, a copolymer of O-methacrylyl perfluorooctanoamidoxime, 52.0% by weight, and n-octylmethacrylate, 48.0% by weight is prepared. A 2% by weight solution of the copolymer in benzotrifluoride is prepared and equal moles of normal methanolic potassium hydroxide solution, based on the ester linkages in the copolymer is added. After 45 hours at 50° C. only 9% of the potassium hydroxide is used up (determined by titration with 0.1 normal hydrochloric acid), indicating the excellent hydrolytical stability of the copolymer. A homopolymer of n-octyl methacrylate on the other hand, uses up 11% of the potassium hydroxide under the same condition, thus indicating the superior hydrolytical stability of O-methacrylyl perfluorooctanoamidoxime polymers.

EXAMPLE IV

Reactive terpolymer of O-methacrylyl perfluorooctanoamidoxime, N-octyl methacrylate and glycidyl methacrylate O-methacrylyl perfluorooctanoamidoxime, 8.8 g., n-octyl methacrylate 1.0 g., glycidyl methacrylate 0.2 g., azobisisobutyronitrile 0.2 g., and n-laurylmercaptan 0.2 g. are dissolved in 30 g. of ethyl acetate and the solution is sealed in an ampul under nitrogen. After polymerizing for 16 hours at 70° the ampul is opened, 30 g. of benzotrifluoride is added and then the polymer solution is added dropwise to 1200 ml. of hexane under vigorous stirring. The precipitated polymer is filtered and dried and a polymer solution containing 5.0 g. of the terpolymer, 0.1 g. p-toluene-sulfonic acid, 245.0 g. of a mixture of ethyl acetate-benzotrifluoride (2:1) is prepared. Cotton and wool are treated with this solution, the fabrics are then air-dried and cured for 2 minutes at 350° F. The following repellency ratings are obtained.

| Fabric[1] | 3-M-Oil Test | AATCC-Water Spray Test |
|---|---|---|
| Cotton | 80 | 80 |
| Wool | 90 | 80 |

[1] 2% copolymer on the fabric.

EXAMPLE V

Reactive terpolymers of O-methacrylyl perfluorooctanoamidoxime

As described in the previous example, terpolymers of O-methacrylyl perfluoroctanoamidoxime and n-octylmethacrylate are prepared using the following reactive acrylics instead of glycidyl methacrylate in amounts of 0.5 to 3% by weight based on the total amount of monomers:

acrylic acid
methacrylic acid
acrylamide
methacrylamide
N-methylolacrylamide
2-hydroxyethyl methacrylate
2-hydroxypropyl methacrylate
3-hydroxypropyl acrylate
t-butylaminoethyl methacrylate Oil and water repellencies obtained with these reactive terpolymers conform with the results obtained in Example IV.

EXAMPLE VI

Reactive terpolymers of O-methacrylyl perfluorooctanoamidoxime and blends thereof A polymer solution as described in Example IV is blended in different ratios with another polymer solution, containing 2% by weight of a copolymer of 98% n-octyl methacrylate and 2% 2-hydroxyethyl methacrylate and 0.94% p-toluenesulfuric acid in ethyl acetate-benzotrifluoride (2:1). These blends are applied to cotton and wool, the fabrics are air dried and cured for 2 minutes at 350° F. and then evaluated as described in Example I. The following repellency ratings are obtained:

| Copolymer blends | | Repellency ratings | | |
|---|---|---|---|---|
| Percent by weight of fluoroterpolymer | Percent by weight of octyl methacrylate copolymer | Fabric[1] | 3-M oil test | AATCC water spray test |
| 100 | | Cotton | 80 | 80 |
| | | Wool | 90 | 80 |
| 60 | 40 | Cotton | 80 | 80 |
| | | Wool | 80 | 80 |
| 40 | 60 | Cotton | 80 | 80 |
| | | Wool | 80 | 70-80 |
| 20 | 80 | Cotton | 80 | 70 |
| | | Wool | 80 | 70 |
| 10 | 90 | Cotton | 80 | 70 |
| | | Wool | 80 | 70 |
| 5 | 95 | Cotton | 60 | 70 |
| | | Wool | 80 | 70 |

[1] 2% of the polymer blend on all fabrics.

EXAMPLE VII

Poly-(O-methacryl perfluorobutyroamidoxime

O-methacrylyl perfluorobutyroamidoxime (prepared by Procedure B), 10 g. and 0.2 g. of azobisisobutyronitrile are dissolved in 10 g. of ethyl acetate and the solution is sealed in an ampul under nitrogen. After polymerizing at 80° for 19 hours, the ampul is opened and the polymer solution is diluted with 30 g. of ethyl acetate and added dropwise to 1000 ml. of hexane under vigorous stirring. The polymer is collected and dried. The polymer starts to melt at 220° C. determined on the micro heating stage. Differential thermal analysis however indicates that chemical changes occur at 106–110° C. The white, brittle polymer which is soluble in acetone, ethyl acetate, ethanol, methanol and ether and is not soluble in benzene, trifluorotoluene, chloroform and carbon tetrachloride, is dissolved in ethyl acetate to provide a 2% by weight solution and is applied to cotton and wool and evaluated as described in Example I.

The following repellency ratings are obtained:

| Fabric [1] | 3-M oil test | AATCC water spray test |
|---|---|---|
| Cotton | 50 | 70 |
| Wool | 50 | 70 |

[1] 2% by weight of the polymer on the fabric.

EXAMPLE VIII

Poly-(O-methacrylyl acetamidoxime)

O-methacrylyl acetamidoxime (prepared by Procedure C) 10 g. and 0.2 g. of azobisisobutyronitrile are dissolved in 20 g. of ethyl acetate and the monomer solution is sealed in an ampul under nitrogen. Immediately after the sample is placed in an 80° bath, the polymer starts to precipitate. After polymerizing at 80° for 17 hours, the ampul is opened and the white precipitated polymer is dissolved in 150 g. of methanol and precipitated into 3000 ml. of acetone. The filtered and dry polymer is a brittle, white powder, soluble in methanol, water, dimethylformamide, dimethylsulfoxide and insoluble in chloroform, ethanol, benzene and acetone. The melting point of the polymer is higher than 380° C., determined on the microheating stage.

O-methacrylyl acetamidoxime may be polymerized the same way as described, using water as a solvent and ammonium persulfate or potassium persulfate as catalysts.

EXAMPLE IX

Poly(O-methacrylyl propioamidoxime hydrochloride

O-methacrylyl propioamidoxime hydrochloride (prepared by Procedure D) 10 g. and ammonium persulfate, 0.2 g. are dissolved in 20 g. of water and sealed in an ampul under nitrogen. After polymerizing for 16 hours at 80°, the precipitated polymer is dissolved in 40 g. of methanol and the polymer solution is added dropwise to 800 ml. of ethyl acetate under vigorous stirring. The precipitated polymer is filtered and dried. The white, brittle polymer is soluble in methanol, hot ethanol and dimethylformamide, but insoluble in water, acetone, benzene and chloroform. On the microheating stage, the polymer starts to melt at 220° C. However, the differential thermal analysis indicates that chemical changes take place above 110° C.

EXAMPLE X

Poly(O-methacrylylpropioamidoxime)

O-methacrylylpropionamidoxime (prepared by Procedure E) 10 g. and azobisisobutyronitrile 0.2 g., are dissolved in 20 g. of ethyl acetate and the monomer solution is sealed in an ampul under nitrogen. After polymerizing for 16 hours at 80°, the ampul is opened and the white precipitated polymer is dissolved in 90 g. of methanol and the polymer solution is added dropwise to 2000 ml. of ethyl acetate under vigorous stirring. The filtered and dried polymer is soluble in methanol, ethanol, dimethylformamide, dimethylsulfoxide and insoluble in acetone, ethyl acetate, ether, chloroform and water. On the microheating stage, the polymer starts to melt at 295–300° C., however the differential thermal analysis indicates that chemical changes take place at 125° and 200° C.

EXAMPLE XI

Poly(O-methacrylyl benzamidoxime

O-methacrylyl benzamidoxime (prepared by Procedure F), 10 g., and azobisisobutyronitrile 0.2 g. are dissolved in 30 g. of chloroform and the solution is sealed in an ampul under nitrogen. After polymerizing at 80° for 16 hours, the ampul is opened and the white precipitated polymer is dissolved in 90 g. of dimethylformamide and the polymer solution is added dropwise to 1800 ml. of ethyl acetate under vigorous stirring. The polymer is collected by filtration and is dried. This polymer is soluble in dimethylformamide, dimethylsulfoxide and pyridine, but insoluble in methanol, ethanol, chloroform, benzene and ethyl acetate. Differential thermal analysis shows no apparent second order transition temperature but a chemical change at 200° C. On the microheating stage the polymer starts to melt at 215° C.

EXAMPLE XII

Actinic-stabilized compositions

Five parts of the homopolymers described in the Examples VIII, IX, X and XI are dissolved in methanol [poly (O-methacrylyl benzamidoxime), Example XI in dimethylformamide] and blended into 100 parts of unstabilized polypropylene powder. (Profax 6501 Hercules). To this blend, 0.1 part of tetra-[methylene 3-(3,5-di-t-butyl-4-hydroxyphenyl)-propionate]-methane is added as antioxidant. Subsequently, the solvent is driven off and the dry powder is milled at 360° F. Then the powder is pressed into films of 5 and 25 mils at 360° F.

The UV-stability of these polypropylene films is evaluated in an Atlas-Color-Fadeometer in such a way, that the samples are bent every 20 hours at a 180 degree angle. The time of failure is noted when the film is so brittle that it breaks when bent at 180 degrees. The following results indicate that the instant polymers are excellent UV-stabilizers for polypropylene and similar hydrocarbon polymers. The colors of the composition after exposure is good in all cases.

| Polymers 5% by weight in polypropylene | Example | Fadeometer test failure (hours) |
|---|---|---|
| Poly(O-methacrylyl acetamidoxime). | VIII | Greater than 1,100 hours for 5 mil film. |
| Poly(O-methacrylyl propioamidoxime hydrochloride). | IX | 240 hours for 25 mil film. |
| Poly(O-methacrylyl propioamidoxime). | X | Greater than 800 hours for 25 mil film. |
| Poly(O-methacrylyl benzamidoxime). | XI | 480 hours for 25 mil film. |
| Control (polypropylene and 0.1% antioxidant). | | 60 hours for 25 mil film. |

EXAMPLE XIII

Polypropylene films (5 mils) containing 5% by weight of the polymers described in Example XII, are dyed with the dyestuff of the following structure at a 2% level by weight.

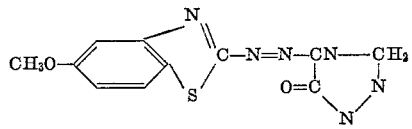

The following procedure is used to apply the dye: Step (a) prescour with 1% soda ash and 1% sodium lauryl sulfate for 20 minutes at 180° F.; drop and rinse clear; Step (b) set dyebath cool with 0.5% sodium lauryl sulfate and 3–5% acetic acid—enter goods; Step (c) add dyes and raise to 195° F. over 30 minutes; run 30–45 min.; drop and rinse; and Step (d) afterscour with 1% sodium lauryl sulfate, 160° F. for 10 min.; drop and rinse.

Although somewhat weak shades are obtained, if the polypropylene film first is treated with a Lewis acid such as $PCl_3$, HCl or $SO_2$, as described in the Belgian Patent 627,798, deep shades are obtained and the samples are resistant to washing and drycleaning. Without the added polymers no dyeing is obtained.

EXAMPLE XIV

Copolymers with soil repellent properties are obtained by bulk or by solution techniques according to the procedures of Examples I and X or, where appropriate, by emulsion polymerization using an ammonium persulfate catalyst and sodium perfluorooctanoate as emulsifier and O- methacrylyl perfluoroamidoxime, with one-third part by weight based on the said amidoxime, of the following comonomers:

| | |
|---|---|
| ethylene | methacrylonitrile |
| vinyl acetate | acrylamide |
| vinyl chloride | methacrylamide |
| vinyl fluoride | vinyl carbazole |
| vinyl chloroacetate | vinyl pyrrolidone |
| acrylonitrile | vinyl pyridene |
| vinylidene cyanide | methyl vinyl ether |
| styrene | methyl vinyl ketone |
| vinyl toluene | butadiene |
| p-chlorostyrene | chloroprene |
| methyl acrylate | fluoroprene and |
| methyl methacrylate | isoprene |
| α-chloroacrylic acid | |

Fabrics coated or sized with 0.5 and 2% by weight of these copolymers have enhanced oil- and water-repellency.

What is claimed is:

1. A polymer compound having a skeletal chain comprising repeating units represented by the formula:

$$R-\underset{\underset{NH_2}{|}}{C}=N-O-\underset{\underset{CH_2}{|}}{\overset{\overset{O}{\|}}{C}}-R_1$$

wherein
R is $C_nX_{2n+1}$, monocarbocyclic aryl or alkylmonocarbocyclic aryl;
$n$ is a whole number of from 1 to 18;
X is hydrogen or fluorine;
$R_1$ is hydrogen or methyl;
and acid addition salts thereof.

2. A polymer compound as claimed in claim 1 having a skeletal chain consisting essentially of repeating units represented by the formula of claim 1.

3. A polymer as defined in claim 1 wherein, in said compound, R is $C_nX_{2n+1}$ and X is fluorine and $R_1$ is methyl.

4. A polymer as defined in claim 1 wherein, in said compound, R is $C_nX_{2n+1}$, monocarbocyclic aryl or alkylmonocarbocyclic aryl and X is hydrogen and $R_1$ is methyl.

5. A polymer as defined in claim 1 wherein, in said compound R is $C_nX_{2n+1}$, $n$ is 7, X is fluorine and $R_1$ is methyl.

6. A polymer as defined in claim 1 wherein, in said compound, R is $C_nX_{2n+1}$, $n$ is 3, X is fluorine and $R_1$ is methyl.

7. A polymer as defined in claim 1 wherein, in said compound, R is $C_nX_{2n+1}$, $n$ is 1, X is hydrogen and $R_1$ is methyl.

8. A polymer as defined in claim 1 wherein, in said compound, R is phenyl and $R_1$ is methyl.

9. A polymer as defined in claim 1 wherein, in said compound, R is $C_nX_{2n+1}$, $n$ is 2, X is hydrogen and $R_1$ is methyl.

10. A polymer as defined in claim 8 in the form of an addition salt with hydrogen chloride.

11. Copolymers of a compound as defined in claim 1 and comonomers which contain an ethylenic linkage.

12. A copolymer of a compound as defined in claim 1 wherein R is $C_nX_{2n+1}$, $n$ is 7, X is fluorine and $R_1$ is methyl and, as the comonomer, n-octyl methacrylate.

13. A copolymer of a compound as defined in claim 1 wherein R is $C_nX_{2n+1}$, $n$ is 7, X is fluorine and $R_1$ is methyl and, as a first comonomer, n-octyl methacrylate, and as a second comonomer, glycidyl methacrylate.

14. A composition of matter comprising a blend of a copolymer of a compound as defined in claim 1 wherein R is $C_nX_{2n+1}$, $n$ is 7, X is fluorine and $R_1$ is methyl and, as a first comonomer, n-octyl methacrylate and, as a second comonomer, glycidyl methacrylate, and a copolymer of n-octyl methacrylate and 2-hydroxyethyl methacrylate.

15. Fabrics which have been coated with the polymers as defined in claim 3 so as to have been rendered both water repellent and oil repellent.

16. Fabrics which have been coated with the polymer as defined in claim 5 so as to have been rendered both water repellent and oil repellent.

17. Fabrics which have been coated with the copolymer as defined in claim 12 so as to have been rendered both water repellent and oil repellent.

18. Fabrics which have been coated with the copolymer as defined in claim 13 so as to have been rendered both water repellent and oil repellent.

19. Fabrics which have been coated with the composition as defined in claim 14 so as to have been rendered both water repellent and oil repellent.

20. Fabrics which have been coated with the polymer as defined in claim 6 so as to have been rendered both water repellent and oil repellent.

21. A composition comprising a difficultly dyeable synthetic organic polymeric material and as an assistant and dyesite from 0.05 to 10% by weight of a compound as defined in claim 4.

22. A composition comprising a difficultly dyeable synthetic organic polymeric material and as an assistant and dyesite from 0.05 to 10% by weight of a compound as defined in claim 7.

23. A composition comprising a difficultly dyeable synthetic organic polymeric material and as an assistant and dyesite from 0.05 to 10% by weight of a compound as defined in claim 8.

24. A composition comprising a difficultly dyeable synthetic organic polymeric material and as an assistant and dyesite from 0.05 to 10% by weight of a compound as defined in claim 9.

25. A plastic composition comprising a normally solid, organic, thermoplastic polymer subject to actinic degradation, containing from about 0.001 to about 10% by weight of a polymer as defined in claim 4.

26. A composition as defined in claim 25 wherein said thermoplastic polymer is solid stereoregular polypropylene.

27. A composition as defined in claim 25 wherein said thermoplastic polymer is solid stereoregular polypropylene and the stabilizing polymer is poly(O-methacrylyl acetamidoxime).

28. A composition as defined in claim 25 wherein said thermoplastic polymer is solid stereoregular polypropylene and said stabilizing polymer is poly (O-methacrylyl propionamidoxime hydrochloride).

29. A composition as defined in claim 25 wherein said thermoplastic polymer is solid stereoregular polypropylene and said stabilizing polymer is poly(O-methacrylyl propionamidoxime).

30. A composition as defined in claim 25 wherein said thermoplastic polymer is solid stereoregular polypropylene and said stabilizing polymer is poly(O-methacrylyl benzamidoxime).

References Cited

Eloy et al.: Helv. Chim. Acta., 45 (1962), pp. 437–449.
Brown et al.: J. Org. Chem., 30 (1965), pp. 3734–8..

HARRY WONG, Jr., Primary Examiner

U.S. Cl. X.R.

117—132, 138.8, 139.5, 140, 142, 148, 155; 260—45.85, 45.9, 65, 78.5, 79.3, 80.3, 80.72, 82.1, 85.5, 85.7, 86.1, 87.5, 87.7, 88.1, 89.7, 564, 828, 836, 857, 859, 862, 874, 887, 893, 899, 901